United States Patent [19]

Josephson et al.

[11] Patent Number: 4,572,954

[45] Date of Patent: Feb. 25, 1986

[54] RADIATION MEASURING SYSTEM USING TRANSISTER FLUX SENSORS

[75] Inventors: Vernal Josephson, Palos Verdes Estates; Edmond L. Greenberg, Culver City, both of Calif.

[73] Assignee: The United States of America as represented by the Secretary of the Air Force, Washington, D.C.

[21] Appl. No.: 619,240

[22] Filed: Jun. 11, 1984

[51] Int. Cl.$^4$ ............................................. G01T 1/24
[52] U.S. Cl. ................................... 250/370; 250/371
[58] Field of Search ................................ 250/370, 371

[56] References Cited

U.S. PATENT DOCUMENTS 3,564,245  2/1971  Koehler .
3,886,379  5/1975  Bickley et al. ........................ 361/98
3,992,627  11/1976  Stewart ................................ 250/360
4,147,934  4/1979  Tomimasu et al. ................. 250/370
4,213,045  7/1980  Fraass et al. ........................ 250/370
4,381,450  4/1983  Cappelli .......................... 250/370 F

*Primary Examiner*—Alfred E. Smith
*Assistant Examiner*—Carolyn E. Fields
*Attorney, Agent, or Firm*—Donald J. Singer; Gerald B. Hollins

[57] ABSTRACT

An ionizing radiation intensity dosimeter apparatus and method based on carrier recombination saturation times for irradiated PN junction semiconductor devices following termination of a radiation pulse. Normally-on quiescent condition, moderate radiation doses at relatively high dose rates, and a read-out arrangement employing gated burst counting are included.

32 Claims, 9 Drawing Figures

RADIATION MEASURING SYSTEM USING TRANSISTER FLUX SENSORS

RIGHTS OF THE GOVERNMENT

The invention described herein may be manufactured and used by or for the government of the United States for all governmental purposes without the payment of any royalty.

BACKGROUND OF THE INVENTION

This invention relates to the field of semiconductor detectors for ionizing radiation dosage sensing and to the apparatus used for dosage detector read-out.

The radiation testing of electronic components and other military hardware during an underground nuclear detonation or a flash X-ray laboratory exposure calls for measurement instrumentation that provides quantative indications of radiation intensity and radiation duration. In the past it has been common to employ thermal luminescent detecting devices, semiconductor devices such as a PIN diode or transistors operating under a variety of algorithms, for these intensity and duration measurements. An interesting list of such prior art radiation detecting devices is presented in the U.S. patent of Takio Tomimasu et al, U.S. Pat. No. 4,147,934 together with a brief description of the advantages and limitations of such prior art radiation sensors.

The prior U.S. patent art also contains several examples of radiation detectors and associated read-out systems. The patent of G. L. Grundy et al, U.S. Pat. No. 3,479,509 for example discloses a junction transistor radiation detector usable in a pulsed nuclear radiation environment where X-ray, gamma ray and neutron bombardment effects are present. The Grundy apparatus utilizes radiation induced ions within a semiconductor element to effect a flux change in the saturable core of a blocking oscillator circuit and achieves a radiation intensity measurement by timing the delay between a radiation burst pulse and the blocking oscillator output pulse. It is especially notable that the Grundy invention relies on junction transistors which are normally biased into the non-conducting mode and reach transient conduction by way of radiation induced ions. These ions produce a transient forward bias of the base emitter junction in the transistor. The Grundy invention also uses the degree of transistor reversed bias and varying magnetic properties of the blocking oscillator feedback transformer as calibration adjustments for the radiation detector. Both the normally off sensing transistor and the use of a blocking oscillator read-out circuit are clear distinctions betweent the Grundy apparatus and the present invention.

The above mentioned patent of Takio Tomimasu et al. U.S. Pat. No. 4,147,934 is concerned with the use of a junction field effect transistor and the radiation induced noise in such transistors as a measurement of received ionizing radiation. Both the use of a junction field effect transistor radiation sensor and the noise based measurement algorithm distinguish the Tomimasu apparatus from the present invention.

The patent of Ronald G. Fraas, U.S. Pat. No. 4,213,045, concerns the use of a metal nitride oxide semiconductor (MMOS) transistor and the effect of radiation on a quantity of electrical charge stored at the boundary of a nitride layer as a radiation sensor. The Fraas invention employs a radiation read-out measurement which is based on sensing the treshold change in the MMOS transistor following a radiation dose. The field effect nature of the sensing transistor, the use of degradation of a stored charge, and employment of the threshold measuring read-out technique distinguish the Fraas apparatus from the present invention.

In the patent of Dale R. Koehler, U.S. Pat. No. 3,564,245, there is disclosed the use of a solid state radiation detector assembly which has a plurality of PN junction radiation sensing cells connected in parallel and electrically isolated by series connected semiconductor diodes. The use of single junction detector cells, an array of cells, and the isolation diode circuit distinguish the Koehler apparatus from the present invention.

SUMMARY OF THE INVENTION

An object of the present invention is to provide radiation dosimeter apparatus which is useable with a variety of ionizing radiation sources.

Another object of the invention is to provide a radiation intensity dosimeter which employs semiconductor radiation sensing elements operating according to a saturation time algorithm.

Another object of the invention is to provide radiation measuring equipment which is particularly suited for use with flash x-ray and detonated nuclear device radiation sources.

A further object of the invention is to provide a dosimeter apparatus which includes a plurality of small and convenient sensing elements that can be easily dispersed to plural locations within a test specimen.

Another object of the invention is to provide radiation dosimeter apparatus wherein access to the measured radiation values can be obtained quickly and without waiting for either sensor processing or for the decay of residual radiation levels to safe values.

Another object of the invention is to provide radiation dosimeter apparatus which is responsive to radiation intensity over the surface of a tested sample and to radiation gradients throughout the volume of the tested sample.

Another object of the invention is to provide a radiation dosimeter apparatus which permits time segregation between the high energy electrically noisy radiation interval and a subsequent low signal level radiation measurement operation.

Another object of the invention is to provide a radiation measurement apparatus which employs low cost juntion semiconductor elements as radiation sensors.

Another object of the invention is to provide radiation dosimeter apparatus which is capable of use in satellites and other space environment hardware.

DETAILED DESCRIPTION

Figure 1:
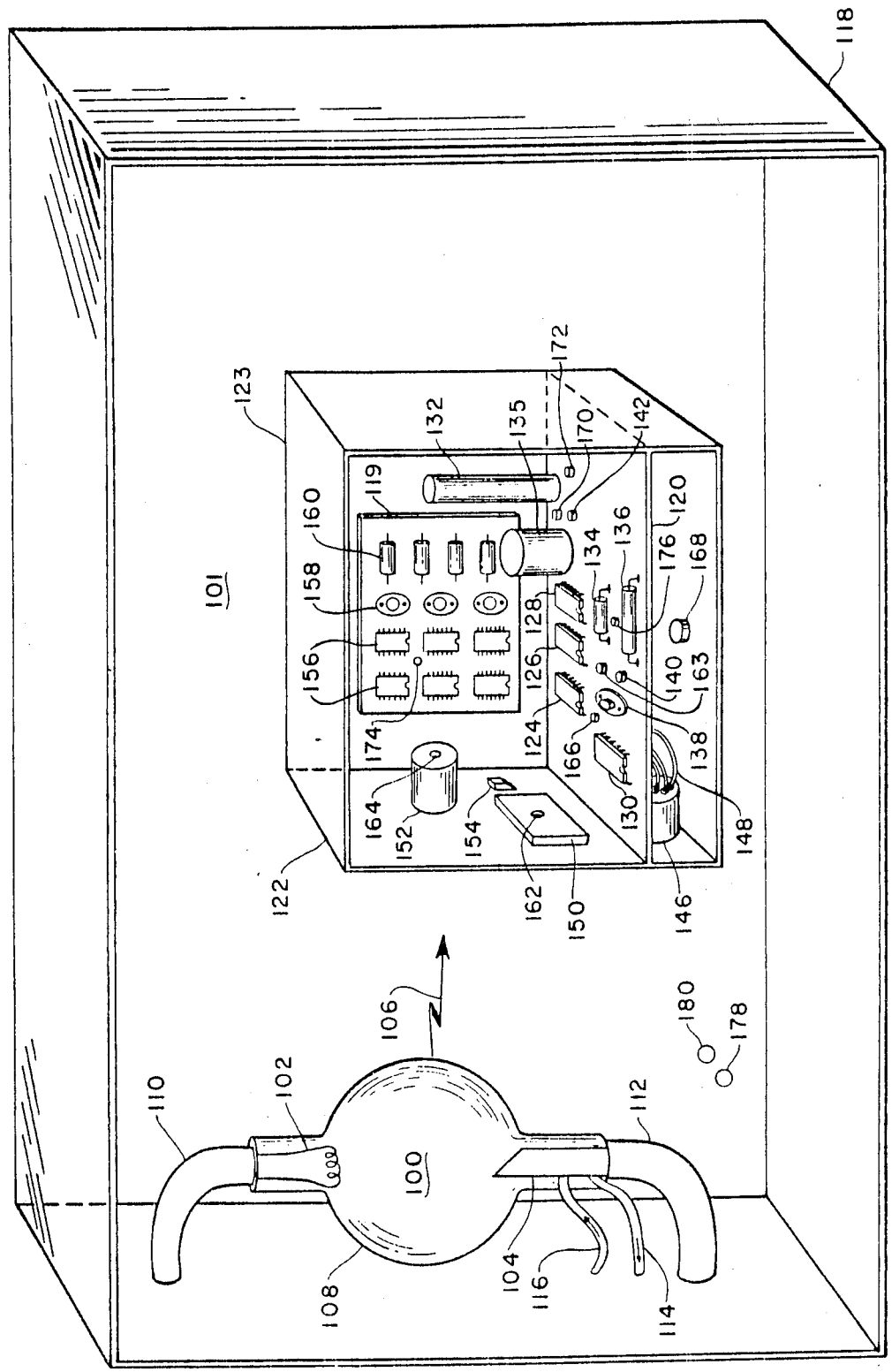
FIG. 1 shows a pulse X-ray radiation testing arrangement.

FIG. 1 of the drawings shows an arrangement which might be employed for exposing a test specimen to pulses of ionizing radiation. The FIG. 1 apparatus consists generally of a source of ionizing radiation 100 such as a flash X-ray generator, which is arranged to radiate a test specimen 101. Both the radiation source 100 and the specimen 101 are located within a radiation containment chamber 118. The radiation source 100 in FIG. 1 is shown in the form of an X-ray tube having an electrically heated filament or cathode 102, an anode 104 and an enclosing envelope 108. The anode and filament elements of the X-ray tube are connected by way of electrical leads 112 and 110 to a controlled source of high voltage electrical energy which acts to accelerate electrons from the filament 102 toward the anode 104. A source of low voltage, high current electrical energy is also provided in the FIG. 1 apparatus for heating the filament 102. As is known in the X-ray art, certain portions of the FIG. 1 X-ray tube may be advantageously provided with forced cooling as is typically represented by the fluid coupling lines 114 and 116 shown connected to the anode 104.

The radiation source 100 in FIG. 1 is intended to provide a source of high intensity short duration radiation pulses which are useful in simulating the radiation occuring with the detonation of a nuclear device. Many variations of the illustrated X-ray tube radiation source are of course possible; these variations include but are not limited to alternate forms of X-ray tube struture, radio-active element sources and particle accelerators of the short pulse duration variety.

The test specimen 101 in FIG. 1 is shown as an electronic "black box" such as might comprise a portion of an airborne computer or radar apparatus or a piece of space electronic equipment. The specimen 101 includes a pair of electronic circuit boards 119 and 120 on which are mounted a plurality of typical electronic components to be tested for combined and individual radiation sensitivity. The typical components of the specimen 101 include a light emitting diode read-out 150, an electrical meter 152, a switch 154, and a cable connector 146 with a wiring bundle 148, all of which are mounted on a front panel 122. The components on the circuit board 120 include four integrated circuits packages 124-130, an electrolytic capacitor 132, a small capacitor 134, a resistor 136 and two transistors 138, 140, the transistor 138 being a power transistor. The electrical components on the circuit board 119 include six integrated circuit flat packs 156, three power transistors 158, and four semiconductor rectifiers 160. The circuit board 120 also includes an iron core transformer 135; transformers of this type are of special interest with respect to radiation testing because of their high density and inheret ability to shield companion circuit elements from radiation flux.

The specimen 101 in FIG. 1 is also shown to include a plurality of radiation sensing elements 162-176 which are dispersed throughout the volume of the box 123 in order that radiation intensity and radiation flux gradient at predetermined points of interest be measureable. An array of electrical connecting leads which is not shown in FIG. 1 is used to convey signals from the sensing elements 162-176 to a biasing and signal processing system which is described below. Not shown in FIG. 1 are the holding fixtures for the radiation source 100 and the test specimen 101 as well as closure covers for the box 123 and the test chamber 118.

The FIG. 1 apparatus also includes a calibrated detector sensor 178 which in some embodiments of the invention may be located outside the main radiation beam of the source 100 or may be provided with some form of radiation shielding. The calibrated detector supplies an output pulse which indicates the start and termination transitions of the radiation pulse from the source 100 and also provides a reference measure of the radiation pulse peak value. An additional sensor, the primary saturating detector 180 is located in close proximity to the calibrated detector sensor 178 in FIG. 1 in order that it receive similar radiation from the source 100.

Operation of the FIG. 1 apparatus contemplates that short duration radiation pulses are generated by the source 100 and received with varying degrees of attenuation at the sensing elements 162-176. Knowledge of the radiation intensity near a failing compenent in the specimen 101 together with a measure of the pulse duration allows calculation of the total radiation dose received by the failing component.

Certain of the components in a radiation specimen are of predictable interest with respect to radiation performance in view of their known susceptability to radiation damage, their location in shielded or heavily exposed radiation areas and their criticality to normal operation of the test system. For components in the predictable interest class it is often desirable to collect data covering the radiation intensity at several points near the component in order that a distribution pattern or the gradient of the received radiation flux be determinable. This predictable interest is pertinent for example to the semiconductor components 124-130, 138, 140, and 142 in FIG. 1. The shielded location of the transistor 142 behind the transformer 135 makes the measurements and gradient calculations for this device to be also of special interest and of unusual complexity. The use of extra sensing elements are frequency justified for location and components of this type.

In determining the intensity of the radiation received at the sensing elements 162-176 in FIG. 1 a measurement is made of the time during which each of the sensing element transistors remains in saturated condition as a result of the radiation pulse. It is found that powered transistors and diodes respond to a burst of radiation, which is short with respect to the recombination times of the transistor conducting carriers, with an output signal that is of the same or longer duration than that of the radiation pulse—depending upon the intensity of the radiation pulse. For radiation pulses which are of sufficient intensity to cause saturation in the sensing transistor the saturation time is found to be proportional to the natural logarithm of the pulse intensity. A system for measuring such saturation time for the sensing elements 162-176 is shown in FIG. 2 of the drawings.

Figure 2:
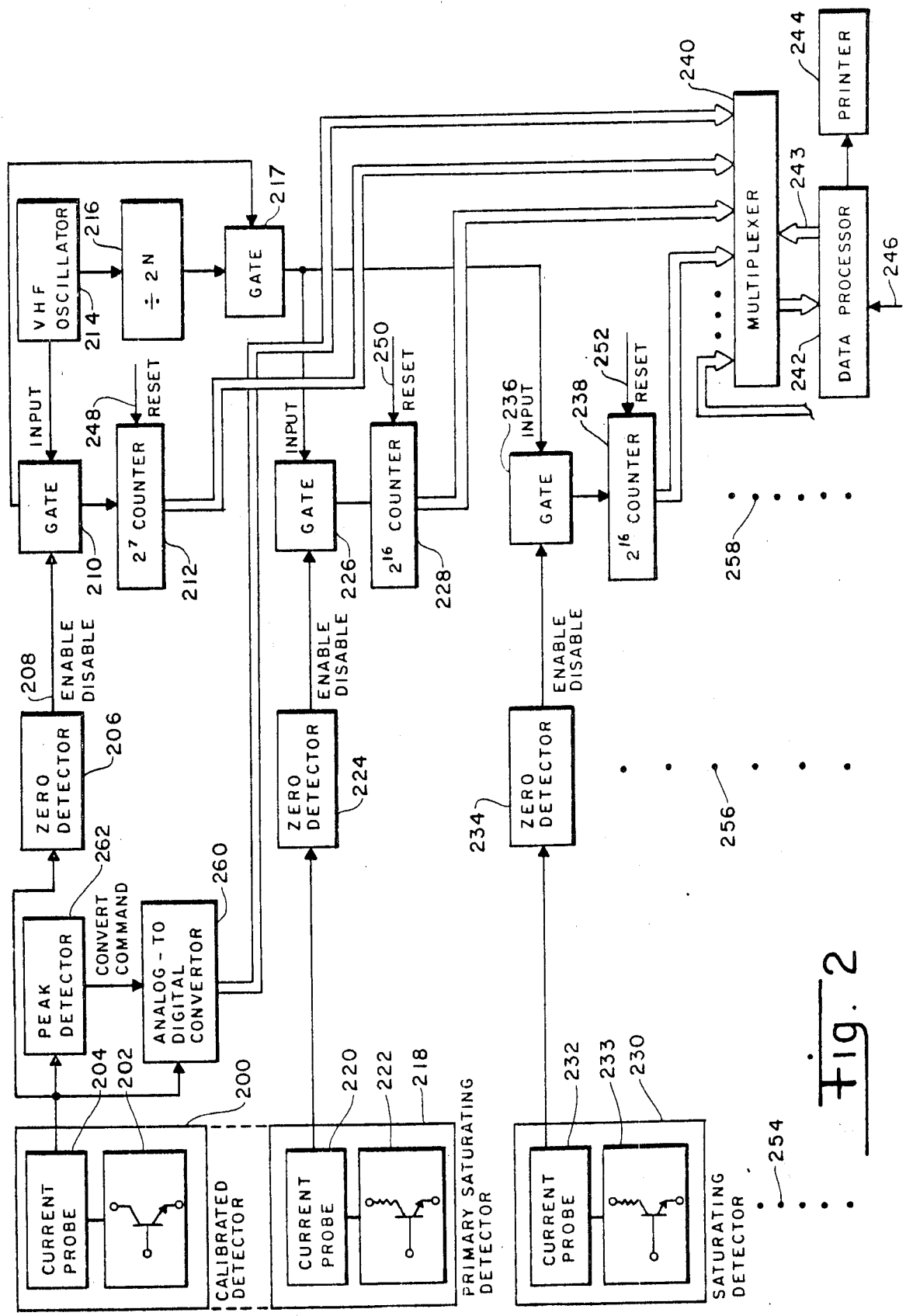
FIG. 2 is a block diagram of a radiation dosimeter employing semiconductor sensing elements.
Figure 3:
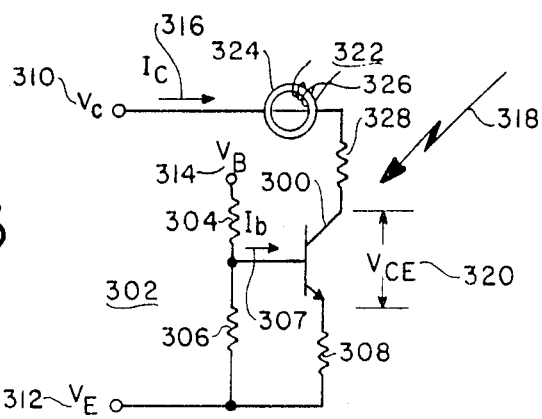
FIG. 3 is an electrical schematic diagram of a junction transistor radiation intensity sensor.
Figure 4:
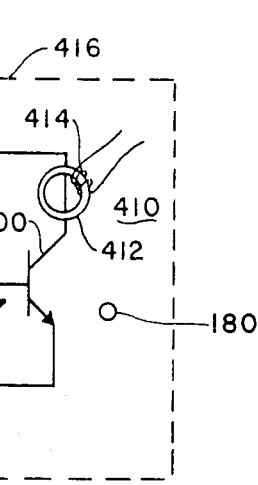
FIG. 4 is an electrical schematic diagram of a radiation time and intensity sensor.
Figure 5:
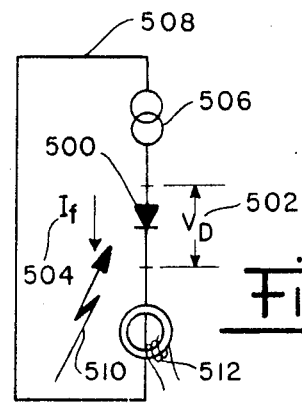
FIG. 5 is an alternate embodiment radiation intensity and duration sensor.

The FIG. 2 apparatus includes a plurality of radiation detectors each having a transistor radiation sensor combined with an appropriate bias network and a transistor current sensing probe; these detectors are illustrated at 200, 218 and 230 in FIG. 2. Electrical schematic diagrams for the different types of detector circuits employed in FIG. 2 are shown in FIGS. 3, 4, and 5 of the drawings and are described in detail in connection with these drawings. In addition to the three radiation detectors, the FIG. 2 apparatus includes three pulse counting readout circuits each of which include a counter, a logic gate and a zero crossing detector circuit. These elements are shown at 212, 210, and 206 for the calibrated detector 200; at 228, 226, and 224 for the primary saturating detector and at 238, 236, and 234 for the typical sensing detector 230. Each of these counters receive pulses for counting from the very high frequency oscillator 214 or the divider 216.

The calibrated detector 200 in FIG. 2 also is coupled to a signal peak storing circuit which includes the peak detector 262 an the analog to digital converter 260.

Data from the counters and the analog to digital converter in FIG. 2 is sent to a processor 242 and printer 244 by way of a switching or multiplex unit 240. The multiplex and processing functions in FIG. 2 can be performed by dedicated hardware or by general purpose computing hardware and tailored software as implied by the FIG. 2 arrangement.

For the purpose of describing operation of the FIG. 2 apparatus it is sufficient to understand that each of the transistor sensors is responsive to short duration ionizing radiation by way of increased collector current which lasts for a time dependent on the radiation intensity and on the transistor's circuit environment. This increased collector current is sensed in each of the transistors by way of the current probes indicated at 204, 220 and 232 in FIG. 2.

The duration of the increased collector current for each sensing transistor is measured in the FIG. 2 system by way of counting the number of fixed frequency oscillator pulses occuring during the interval of transistor high collector current. In the case of the calibrated detector 200, saturation may be limited by way of shielding or sensor placement out of the primary radiation beam as is shown at 178 in FIG. 1. Limited radiation exposure together with the absence of a transistor electrical load resistance for the sensor 202 prevents saturation in this device and thereby assures the period of high collector current to be relative short in this device i.e. substantially the duration of the radiation pulse. For measuring this relatively short interval of high collector current in the calibrator detector 200 a signal of higher frequency is taken directly from the oscillator 214 in FIG. 2 and is counted by the modulus 128 ($2^7$) counter at 212. The duration of this counting is determined by the logic gate 210 which is caused to open by an enable/disable signal 208 generated by the zero crossing detector circuit 206. The zero crossing signal occurs in response to the starting and terminating transitions of the high collector current interval in the transistor 202. A waveform representing the current pulse in the calibrated detector 200 is shown at 610 in FIG. 6b; the zero crossing detector 206 is responsive to the rise and fall 612, 614 in the FIG. 6b waveform.

The duration of the high collector current pulse in the calibrated detector 200 is expected to be in the sub microsecond region since this pulse is directly responsive to the radiation pulses. Specifically, collector current pulses in the forty nanosecond range are expected from the FIG. 1 apparatus; in the case of the saturating detectors 218 and 230, the duration of the high collector current pulse may reach tens of microseconds. Thirty microseconds is a frequent value, for these saturation stretched pulses. A correspondingly greater counting capacity and a slower counting rate are therefore appropriate in the saturating detector counters. The frequency divider 216 is used to decrease the output frequency of the oscillator 214 by a factor such as 2, 4, 8, or 16 in order that a reasonable count modulus be possible for the long duration saturated transistors 222 and 233—as is illustrated by the modulus 65,536 ($2^{16}$) selected for the counters at 228 and 238.

The frequency of the oscillator 214 may be selected for a particular embodiment of the FIG. 2 apparatus by considering the saturation time of the selected sensor transistors at the radiation intensities involved. Generally it is desirable to employ frequencies in the very high frequency range together with relatively slow transistors which have large base regions and therefore relatively long carrier recombination times in the FIG. 2 system. Power transistors, audio frequency transistors and low speed switching transistors have been found desirable for use as the FIG. 2 sensors since such devices result in desirably long saturation times. Silicon is the preferred sensor transistor fabrication material however devices made of germanium, gallium arsenide, or other semiconductor materials could be used. The term PN junction is used herein to refer generically to a variety of semiconductor devices which could be employed including various types of diodes, and transistors of any polarity configuration and fabrication materials.

Operation of the FIG. 2 apparatus contemplates that the measurement of sensing transistor saturation times will commence with a transition of the radiation pulse or the corresponding transition of the pulse of the calibrated detector 200—by way of the gate 217. The gate 217 is arranged to provide counting pulses to the gates 226 and 236 and to the counters 228 and 238 upon termination of the radiation pulse as determined by the output of the gate 210. In an alternate arrangement of the FIG. 2 apparatus the gate 217 may be omitted and counting of the oscillator pulses commenced immediately with the initial change of collector current in the sensing transistor 22 and 233. In this alternate arrangement an adjustment of the final count for removing the period of radiation presence may be made by substracting the count of the counter 212 from that of the counters 228 and 238; in many instances such adjustment is of minor significance in view of the long saturation times realized with the sensor transistors 222 and 233 and the relative short duration of the radiation pulse. This subtraction, if made, would of course require accommodation for the different input frequencies to the counters 212 and 228–238.

The FIG 2 apparatus assumes that several saturating detectors will be present in an operating system, the presence of additional detectors is indicated by the dotted lines 254, 256, and 258. The counters 228, 238 and the additional counters represented by the dotted line 258 also serve to capture and store the measured saturation time values for each of the saturated detectors until this information can be transmitted by way of the multiplexer 240 to a data processing system 242. The multiplexer 240 is controlled by a signal 243 from the data processor 242 in a manner known in the electronic art. In the absence of storing ability in the counters 228 and 238 the multiplexer 240 would be required to operate at a very high rate in order that the real time disappearance of saturation signals from the zero detector 224, 234 and 256 be sensed with usable accuracy.

The data processor 242 may be any convenient digital computer with suitable programming software or alternately may be a dedicated electronic circuit capable of performing numeric calculations, data organization, data storage, multiplexer control and printer control. The selection and arrangement of a suitable data processing apparatus for the processor 242 is within the capability of persons skilled in the electronic and computing art.

An important part of the numeric calculations to be performed by the data processing apparatus is the correlation of transistor saturation times for the saturating detectors with radiation intensity values. The calculations can be performed according to a predetermined experimentally derived relationship using a table lookup algorithm or an empirical mathematical relationship. The numeric calculations to be performed also include the correlation of amplitude values in the output of the calibrated detector 200 with saturation times for the primary saturating detector 218.

The primary saturation detector 218 in FIG. 2 is intended to be mounted in close proximity with the calibrated detector 200 in order that the radiation intensity received by the calibrated detector 200 and this primary saturating detector be the same. Receipt of similar radiation intensities in the two differently responding detectors 200 and 218 allows calibration of the individual saturating detectors 233 and 254 on a group basis without the tedium of individual calibration for each use of the FIG. 2 apparatus. The intensity of the radiation pulse received by the calibrated detector 200 is measured by the analog to digital converter circuit 260 which is connected to the electrical output of the calibrated detector. This peak electrical output is converted into digital form upon detection of the waveform peak by the peak detector 262. The availability of an off main beam radiation peak measurement in both amplitude and saturation time forms allows correlation of these two sensing forms and allows determination of the saturation time versus radiation intensity characteristics of the saturation detectors. For such correlation it is of course desirable for each of the sensing transistors 202, 222, 233 to be as nearly identical as possible; preferably these transistors are all obtained from the same manufacturing wafer and are additionally selected from this wafer lot for having similar characteristics.

Other arrangements for measuring the saturation time of the transistors in FIG. 2 are of course within the capability of persons skilled in the electronic art. Such alternate arrangement might for example include analog circuitry wherein the voltage across a capacitor was allowed to increase during the saturation interval and then measured upon termination of the saturation interval.

Reset signals are indicated at 248, 250, 252 and 246 for several of the FIG. 2 elements, these reset signals may be generated by the data processor 242 or special electrical circuits which are not shown and which are responsive to the completion of processing information from a particular radiation test event.

FIG. 3 of the drawing shows a possible embodiment of the saturating detectors 218 and 230 in FIG. 2. The FIG. 3 apparatus includes a NPN junction transistor 300 which may for example be a silicon power transistor such as the types 2N2270 or 2N3055 (or alternately could be a non power transistor such as the type 2N2222A. The transistor 300 is shown to be biased into an amplifier configuration wherein some predetermined base and collector current flows 307 and 316 and collector to emitter voltage drop 320 exist. The magnitude of these currents and voltages are established by the magnitude of the supply voltages 310, 312, and 314 together with the electrical value of the resistors 304, 306, 308 and 328 in the transistor bias network 302. The selection of these values is known in the electronic art and is generally comprised of selecting a transistor base voltage and the resulting emitter voltage which will provide the desired collector and emitter current flow in the resistor 308. This current flow will cause the selected portion of the $V_c$ to $V_E$ voltage difference to appear respectively across the resistor 328 and between the collector and emitter terminals of the transistor 300. For the present sensing purpose it is desirable for the emitter resistance 308 to be small in order that saturation of the transistor 300 by the ionizing radiation indicated at 318 produce an easily detected collector current change.

The FIG. 3 saturating detector circuit includes a collector resistance 328 that is selected to limit the current in the transistor 300 to a safe value during saturation; the value of this resistance also influences the duration of the saturation time from a particular radiation intensity—larger resistance values providing longer saturation times for a given radiation intensity.

At 322 in FIG. 3 there is shown a structure which represents the current probes 204 and 220 and 232 in FIG. 2. These current probes include a magnetic circuit member 324 which may be comprised of ferrite or other magnetic materials and a pickup coil 326 which provides an electrical signal responsive to current transitions in a conductor passing through the magnetic circuit member 324. Current probes of the type indicated at 322 are readily available from the electronic instrument manufacturing companies for use with oscilloscopes and other electronic instruments. Other current sensing arrangements can be employed with the sensing transistors if desired; most notably, a series resistance of small value together with suitable signal amplification can provide the needed waveform information. The inductance added to the transistor collector circuit by the current probe or the resistance added by such a series resistor can affect the current waveform in extreme conditions as is known in the electrical art. The preferred current probe arrangement minimizes this influence.

For the circuit arrangement shown in FIG. 3 both the collector supply voltage 310 and the base supply voltage 314 would have positive polarity with respect to the emitter supply voltage 312 in order that the desired amplifier operating point on the transistor characteristic curves be established. As is known in the amplifier art, the operating point of the transistor 300 will move up and down a load line which may be drawn on the transistor characteristic curves in response to either the application of a base driving signal at the circuit node between the resistors 304 and 306 or in response to the incidence of ionizing radiation as indicated at 318. The extent of this excursion along the load line is determined by selection of the circuit parameters as indicated previously and as is well known in the transistor amplifier art.

Phrases such as collector to emitter voltages are intended to be without polarity significance herein, it being readily feasible to substitute PNP transistors for the NPN configuration shown in FIG. 3 so that the recitation order of emitter to collector voltage would be reversed to describe a positive to negative voltage drop. The concepts described with respect to transistors, diodes and other polarity sensitive devices herein are equally applicable to either polarity sense.

The selection of a suitable transistor type for the transistor 300 involves consideration of transistor base width and frequency characteristics as described above.

For pulse X-ray equipment, burst times or pulse durations in the forty nanoseconds range with rise times of 10 nanosconds are common together with transistor saturation times of 10 to 30 microseconds. Accurate detector response to rise times in the order of 10 nanoseconds, if desired, requires careful selection of the transistor 300 in order that transistor frequency characteristics not obscure transitions occuring at this speed. Of the above listed possible transistor types the 2N2222A is most compatible with transitions occurring at this speed; other available devices may be more desirable than any of these types.

It should be noted that the transistor 300 in FIG. 3 is normally biased into the conducting state and responds to the receipt of ionizing radiation by increasing this degree of conduction until saturation of the transistor results.

In FIG. 4 of the drawings there is shown an embodiment for the calibrated detector 200 of FIG. 2. The FIG. 4 circuit includes a NPN transistor 400 and a biasing network together with a current probe apparatus 410 and an indicated radiation shield 416. Also located in the radiation shield 416 in close proximity to the calibrated detector transistor 400 and subject to the ionizing radiation 408 is the primary saturating detector 180 which was earlier shown in FIG. 1 and at 218 in FIG. 2. The primary saturating detector is again shown symbolically at 180 in FIG. 4 and may employ a circuit of the type shown in FIG. 3 and described above.

The transistor 400 in FIG. 4 is biased into conduction in an amplifier configuration by a the bias network which in its simplest form may consist of merely the resistor 402. This resistor is selected in value to provide a small quiescent current in the transistor 400. As in the case of the FIG. 3 sensor, the collector supply 404 is positive with respect to the emitter supply 406 causing a forward biased condition in the base emitter junction and a reversed biased condition in the base collector junction. Since the collector and emitter resistors shown in FIG. 3 are absent from the FIG. 4 circuit, the transistor 400 would experience significantly larger collector currents for a given radiation intensity than would the transistor 300 in FIG. 3. As a result of the unlimited nature of this current the transistor 400 will not become saturated and could be damaged by heating if a normal radiation induced conduction increase occur. This damage is precluded by the limited radiation intensity received by the transistor 400 as a result of its location out of the main radiation path—as shown at 178 in FIG. 1; such damage can also be precluded by the incorporation of a radiation limiting shield as indicated at 416 in FIG. 4. The functions of the calibrated detector sensor transistor 400 in FIG. 4 are to provide a time indication of the start and termination of a radiation pulse and an indication of the attentuated peak magnitude of the radiation pulse, these signals are obtained from the transistor 400 circuit by way of the magnetic circuit and winding 412 and 414 of the probe apparatus 410.

The biasing networks 302 and 402 in FIGS. 3 and 4 are shown to be comprised of passive, resistive, components; such components are minimally responsive to radiation and may therefore be physically located either near the sensing transistor or in a remote and radiation free environment. Location in a remote radiation free environment removes all possibility of radiation induced change in the electrical properties of these components and permits the addition of semiconductor components (e.g. Zener diode collector and base voltage supply regulators) without concern for radiation damage; a remote location for the bias resistors is therefore the preferred arrangement.

FIG. 5 of the drawings is a composite diagram showing actually several alternate embodiment sensor devices for use in the invention. The FIG. 5 circuit comprises a forward biased diode 500 which conducts a current 504 that is developed by a source 506; the current circuit is completed by the closed loop conductor 508. The voltage drop across the diode 500 is indicated at 502 and a current probe for sensing changes in the current 504 is indicated at 512. As an alternate embodiment for the calibrated detector transistor shown in FIG. 4 of the drawings, the diode 500 may be embodied as a PIN diode; with such a diode the incidence of radiation indicated at 510 results in a decrease in the diode forward voltage drop 502. For use with the current probe 512 the source 506 should be a voltage stable source, that is, a source of voltage which is independent of current magnitude. With a voltage source at 506 the current 504 will be responsive to the radiation intensity and both an amplitude and timing signal can be obtained with the current probe 512. An alternate sensing arrangement for a PIN diode in FIG. 5 involves use of a current source at 506 and sensing the diode forward voltage drop 502 as an indication of radiation.

A junction diode may also be employed at 500 in FIG. 5 as an alternate for the FIG. 3 saturating transistor sensor; saturation time delay would also be experienced in such diode as a response to incident radiation. Either of the above described constant current or constant voltage sensing arrangements could be used for sensing the start and termination of saturation condition with such a junction diode. Generally it is found that the transistors of FIG. 3 and FIG. 4 provide more readily decernible signals and more easily measured saturation times than do the diode arrangements of FIG. 5; transistors are therefore to be preferred as the radiation detectors.

FIG. 6 of the drawings including the views 6a, 6b, 6c and 6d illustrate typical waveforms expected during operation of the described apparatus. At 600 in FIG. 6a there is shown a pulse which represents the radiation received from the source 100 in FIG. 1. As has been indicated above, the pulse 600 can typically have a time duration 606 which is measured in tens of nanoseconds and pulse rise and fall times, indicated at 602 and 604, which are between one and ten nanoseconds. The amplitude of the radiation pulse as indicated at 601 and 608 is a function of the detector distance and angle relation with the source 100.

Figure 6D:
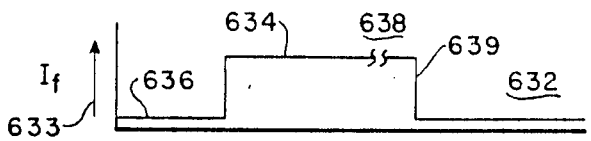
FIGS. 6a–d show waveforms which explain the operation of the disclosed apparatus.
Figure 6C:
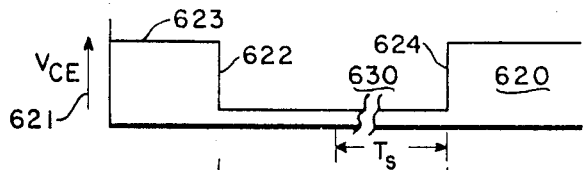
Figure 6B:
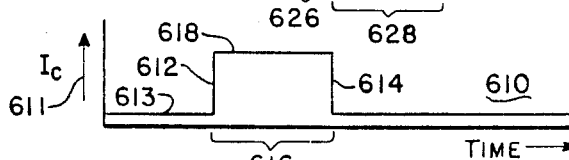
Figure 6A:
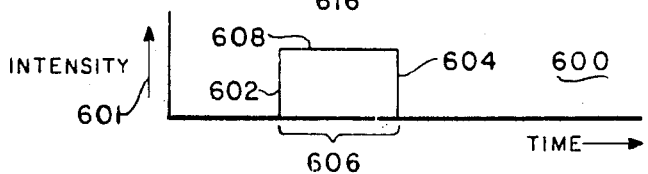

At 610 in FIG. 6b there is shown a waveform of transistor current such as might be expected in the collector circuit of the calibrated detector transistor of FIG. 4. As indicated by the pulse 610 the timing of the collector current closely follows the timing of the radiation pulse 600 including similar rise and fall times 612 and 614. The amplitude of the collector current pulse 618 is of course a function of transistor radiation response and placement; generally this amplitude is limited by shielding or placement to values that can be safely conducted by the selected calibrated detector transistor. As indicated at 613 the current in the calibrated detector transistor has some non-zero quiescent or residual value which is achieved again following the radiation pulse. As a result of the magnetic coupling between the collector current and the coils 326 and 414 this quiescent or residual current in the collector circuit of the transistors is not observed at the coil terminals; the signal at these terminals consists of the transient portion of the collector current waveforms as is well known in the alternating current circuitry art.

Collector voltage for a saturating transistor of the type shown in FIG. 3 is illustrated by the waveform 620 in FIG. 6c. The waveform 620 includes a quiescent high voltage value 623, a fall time 622 that is responsive to the rise of radiation intensity, and a delayed rise time 624 which occurs following a period of saturation indicated at 628. The total duration of the pulse 620 is indicated at 626 and includes therefore the duration of the radiation pulse and the saturation time 628; this time is, as suggested by the discontinuity 630, considerably longer than the radiation indicative pulses 600 and 610.

At 632 in FIG. 6d there is shown a representation of the current pulse which is expected from a FIG. 5 diode operated with a voltage source 506 in response to receipt of the radiation pulse 600. As shown with the pulse 632, the diode has the quiescent forward current indicated at 636 and this current sharply increases in response to the radiation pulse. The increased current reaches the level 634 and falls following a delay for saturation which includes a discontinuity 638 of the type shown at 630. As is indicated by the early occurance of the pulse fall 639 in FIG. 6d, prior to the pulse rise at 624 in FIG. 6c, the duration of saturation in the FIG. 5 diode circuit is shorter than that for the FIG. 3 transistor.

It should be noted that sensing transistors in a circuit of the type shown in FIG. 3 receive the benefit of inherent protection from radiation damage to their own structure. As is know in the transistor art, the susceptibility of a junction transistor to radiation damage is a function of the voltage existing across the transistor junctions at the time of radiation incidence. In the described apparatus the sensing transistors proceed immediately into saturation upon receipt of radiation pulse; in this condition, the collector to emitter voltage is minimal and the radiation susceptibility of the devices is therefore sharply reduced. While a dose rate of 100 rads is usually sufficient to place a junction transistor in saturation, dose rates in the order of $10^{12}$ (10E12) rads per seconds are tolerable for the saturating transistor sensors of the described apparatus. Since the apparatus is primarily contemplated for use with pulse radiation wherein dose times in the order of 40 nanoseconds are expected, this $10^{12}$ rads per second dose rate results in a total dose in the order of $4 \times 10^4$ rads for each exposure of the saturating transistors. Total doses in the range of $10^5$ rads have been found acceptable with the present apparatus.

It should also be noted that the readout of the sensor transistor saturation times in the desclosed apparatus is accomplished after the electrical noise accompanying the discharge of a flash X-ray tube has subsided. Time separation between these high energy and low energy events reduces the complexity of the signal protection and noise shielding measures that would otherwise be necessary in determining transistor saturation times.

The capability of the present apparatus to provide a relatively large number of small radiation sensors and provide rapid read-out of the radiation experience of these sensors immediately following a test event provide major increases in the convenience of performing radiation intensity measurements and calculations of radiation gradient. The ability to learn of the radiation intensity immediately following an exposure and without having to perform chemical read-out steps or await the decay of radiation to safe values is a particular convenience afforded by the invention. The significance of this convenience is greatly enhanced in a nuclear device detonation testing environment.

While the apparatus invented described constitute preferred embodiment of the invention, it is to be understood that the invention is not limited to this precise form of apparatus or method and that changes may be made therein without departing from the scope of the invention which is described in the appended claims.

What is claimed is:

1. Radiation dosimeter apparatus comprising:
    a saturable PN junction quiescently biased into forward conduction and located to receive an unknown sub microsecond pulse of radiation from an ionizing radiation source;
    means for measuring the time required after termination of said radiation pulse for said PN junction to return from saturated condition to said quiescent forward biased condition;
    predetermined correlating means, relating saturation time with radiation intensity, for converting the measured saturation time to a measure of radiation intensity.

2. The apparatus of claim 1 wherein said PN junction is a portion of a junction transistor.

3. The apparatus of claim 2 wherein said correlating means includes means for relating junction saturation times less than 500 microseconds and radiation source pulses of less than 100 nanoseconds duration to measures of radiation intensity.

4. The apparatus of claim 2 further including a plurality of radiation receiving junction transistors dispersed through a work sample subjected to said radiation pulse.

5. The apparatus of claim 1 wherein said means for measuring includes a second PN junction located to receive a lesser intensity of said pulse radiation and connected to generate an output signal identifying the termination of said radiation pulse and the commencement of said saturation time.

6. The apparatus of claim 5 wherein said second PN junction is comprised of a PIN diode.

7. The apparatus of claim 5 wherein said saturable PN junction and said second PN junction are each part of junction transistors.

8. The apparatus of claim 1 wherein said apparatus is responsive to radiation from a flash X-ray source.

9. The apparatus of claim 1 wherein said apparatus is responsive to radiation from a detonated nuclear device.

10. The apparatus of claim 1 wherein said predetermined correlating means includes an inverse natural logarithim relationship.

11. The apparatus of claim 1 wherein said PN junction comprises a semiconductor junction diode.

12. A method for measuring the intensity of pulsed ionizing radiation comprising the steps of:
    establishing an amplifier load line operating point in a junction transistor;
    exposing the transistor to a sub microsecond pulse of ionizing radiation of unknown intensity, thereby moving said operating point along said load line to a condition of transistor saturation;
    sensing the termination of said radiation pulse;
    timing the persistence of said saturation condition after termination of said radiation pulse;

relating the duration of said saturation persistence to radiation intensity according to a predetermined relationship.

13. The method of claim 12 wherein said step of timing saturation persistence includes exposing a PN junction to a nonsaturating attenuated intensity of said pulse of ionizing radiation and starting said timing at an output signal transition of said PN junction.

14. The method of claim 13 wherein said step of timing includes counting transitions of a high frequency signal between on and off gatings thereof by said signal transition and the end of said saturation condition.

15. Radiation dosimeter apparatus comprising
a bipolar junction sensing transistor having collector-base and base-emitter semiconductor junctions;
means for forward biasing said base-emitter junction and reverse biasing said collector-base junction;
means for exposing said transistor to a pulse of ionizing radiation energy;
means for measuring the radiation induced saturation time in said transistor;
predetermined means relating said measured saturation time with measures of radiation intensity.

16. The apparatus of claim 15 further including a radiation responsive non saturating first calibration transistor and a radiation saturable second calibration transistor.

17. The apparatus of claim 16 wherein said first and second calibration transistors are located in close proximity in a different radiation receiving location than said sensing transistor.

18. The apparatus of claim 17 including a plurality of said junction sensing transistors each located in a radiation receptive location attending a test specimen.

19. The apparatus of claim 18 further including a plurality of current probe means, one for each said transistor, for sensing signal current transitions in said transistors.

20. The apparatus of claim 15 wherein said means for forward biasing is located in an area of attenuated radiation.

21. The apparatus of claim 15 wherein said bipolar junction sensing transistor is a low frequency transistor.

22. The apparatus of claim 21 further including load means connected in series with the collector terminal of said sensing transistor collector-base junction for limiting the saturation current in said collector-base junction.

23. The apparatus of claim 22 wherein said predetermined means relating saturation time is correlated with the electrical value of a load resistance in said load means.

24. The apparatus of claim 22 wherein said means for measuring includes means responsive to said saturation time for gating a high frequency signal and means for counting cycles of said high frequency signal during the period of said gating.

25. Radiation dosimeter apparatus for measuring the intensity of pulsed submicrosecond ionizing radiation received by a specimen comprising:
PN junction means for generating a first electrical signal identifying the starting and terminating transitions of a received radiation pulse and a second electrical signal having a predetermined amplitude relationship with the peak intensity of said received radiation;
first radiation saturable junction transistor means located adjacent said PN junction means and biased to have a predetermined quiescent collector current flow for generating a first saturation signal starting at one of said radiation transition signals and having predetermined duration correlation with the peak intensity of said received radiation and with the amplitude of said second electrical signal;
second radiation saturable junction transistor means similar in characteristics to said first radiation saturable means and located in a predetermined position of interest with respect to said specimen and biased to a predetermined quiescent collector current flow, for generating a second saturation signal starting at one of said radiation transition signals and having predetermined duration correlation with the intensity of said received ionizing radiation;
means including a predetermined correlation between saturation time and radiation intensity for generating a radiation intensity signal from said second saturation signal.

26. The apparatus of claim 25 wherein said PN junction means includes a radiation responsive non saturable second transistor means.

27. The apparatus of claim 26 including a plurality of said radiation saturable junction transistor means each located at positions of interest with respect to said specimen for sensing radiation intensity at a plurality of specimen locations.

28. The apparatus of claim 27 wherein said plurality of transistor means includes junction transistors of predetermined similar characteristics.

29. The apparatus of claim 28 wherein said plurality of transistor means includes a plurality of junction transistors taken from the same substrate wafer.

30. The apparatus of claim 29 wherein said transistors are low frequency silicon transistors.

31. The apparatus of claim 30 wherein said transistors are of the power amplifier type.

32. The apparatus of claim 27 further including multiplex switching means for communicating measured saturation time data to a common processor.

* * * * *

UNITED STATES PATENT AND TRADEMARK OFFICE
CERTIFICATE OF CORRECTION

PATENT NO. : 4,572,954

DATED : February 25, 1986

INVENTOR(S) : Vernal Josephson et al

It is certified that error appears in the above-identified patent and that said Letters Patent is hereby corrected as shown below:

Column 6, line 36, "22" should read ---222---.

Column 11, line 24, "a delay" should read ---an extended delay---.

Signed and Sealed this

Fifteenth Day of July 1986

[SEAL]

Attest:

DONALD J. QUIGG

Attesting Officer

Commissioner of Patents and Trademarks